(12) United States Patent
Sidiropoulos et al.

(10) Patent No.: US 6,618,786 B1
(45) Date of Patent: Sep. 9, 2003

(54) CURRENT-MODE BUS LINE DRIVER HAVING INCREASED OUTPUT IMPEDANCE

(75) Inventors: Stefanos Sidiropoulos, Palo Alto, CA (US); Yingxuan Li, Cupertino, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

(21) Appl. No.: 09/650,430

(22) Filed: Aug. 28, 2000

(51) Int. Cl.⁷ .................. G06F 13/14; H03K 19/0175
(52) U.S. Cl. .......................... 710/305; 326/86
(58) Field of Search .................. 710/305; 326/30, 326/83, 86; 327/108, 541

(56) References Cited

U.S. PATENT DOCUMENTS

| | | | |
|---|---|---|---|
| 4,941,153 A | | 7/1990 | Kelley et al. |
| 5,254,883 A | * | 10/1993 | Horowitz et al. ............. 326/30 |
| 5,796,276 A | | 8/1998 | Phillips et al. |
| 6,009,487 A | | 12/1999 | Davis et al. ................ 710/105 |
| 6,069,504 A | * | 5/2000 | Keeth .......................... 327/108 |
| 6,163,178 A | * | 12/2000 | Stark et al. .................. 327/108 |
| 6,294,934 B1 | * | 9/2001 | Garrett, Jr. et al. ......... 327/108 |
| 6,326,810 B1 | * | 12/2001 | Keeth .......................... 326/83 |

OTHER PUBLICATIONS

Bult et al., "A Fast–Settling CMOS Op Amp for SC Circuits with 90–dB DC Gain", IEEE Journal of Solid–State Circuits, vol. 25, No. 6, Dec. 1990, pp. 1379–1384.
Sackinger et al., "A High–Swing, High–Impedance MOS Cascode Circuit", IEEE Journal of Solid–State Circuits, vol. 25, No. 1, Feb. 1990, pp. 289–298.

* cited by examiner

Primary Examiner—Xuan M. Thai
Assistant Examiner—Tim Vo
(74) Attorney, Agent, or Firm—Lee & Hayes, PLLC

(57) ABSTRACT

A current-mode bus line driver includes a primary current source and a supplemental current source. The primary current source is an open-drain NMOS transistor, whose output current decreases at low output voltages. The supplemental current source is responsive to low output voltages to provide a supplemental output current, in addition to the output current of the primary current source. The supplemental current source consists of an inverter and a current mirror. The inverter produces a correction current that is inversely related to the voltage output of the primary current source. This correction current is amplified by the current mirror to produce the supplemental output current. The current mirror is self-limiting, in that its current output falls off at very low output voltages.

55 Claims, 6 Drawing Sheets

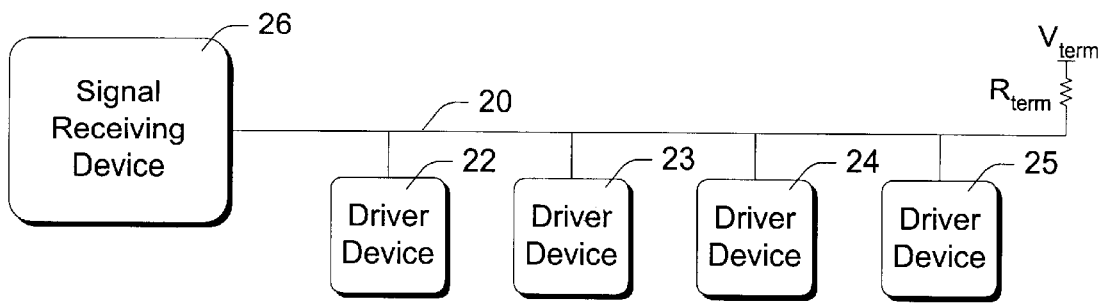
Fig. 1 - Prior Art
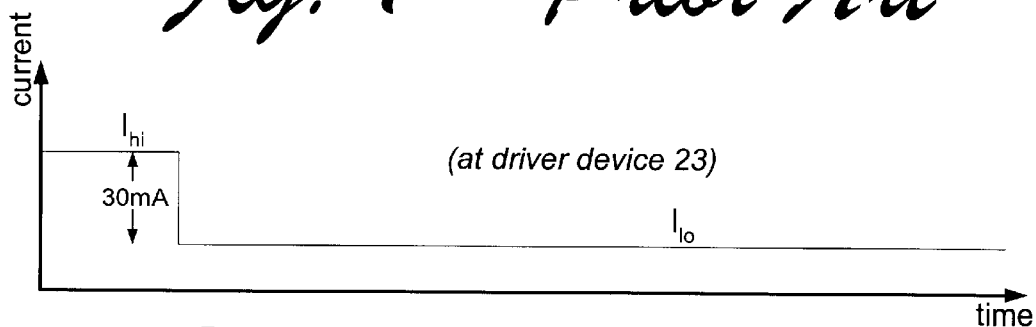
Fig. 2 - Prior Art
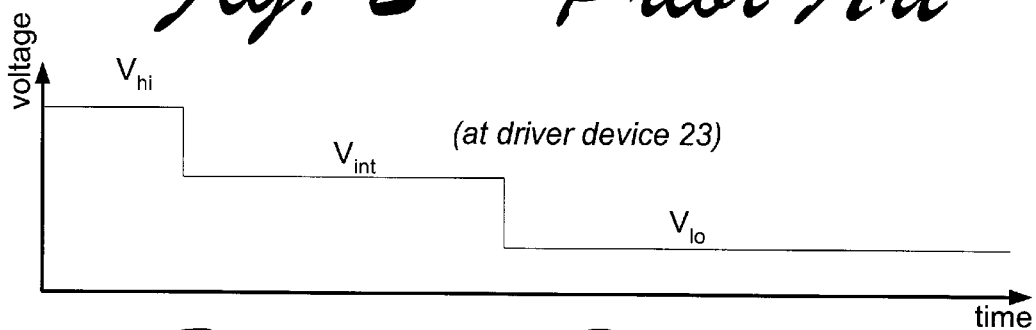
Fig. 3 - Prior Art
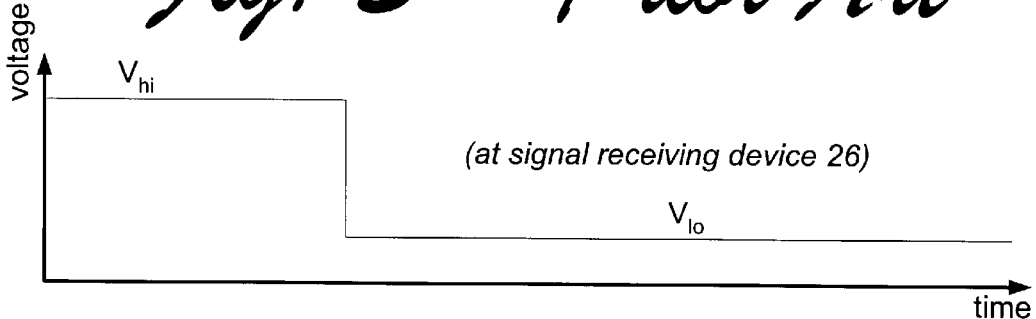
Fig. 4 - Prior Art

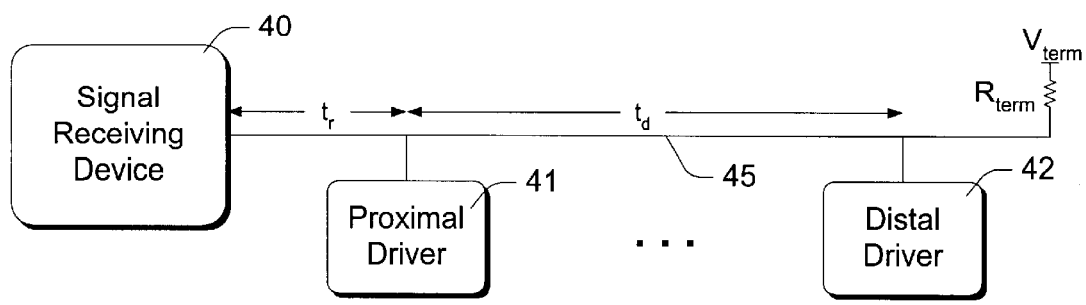
Fig. 5 - Prior Art
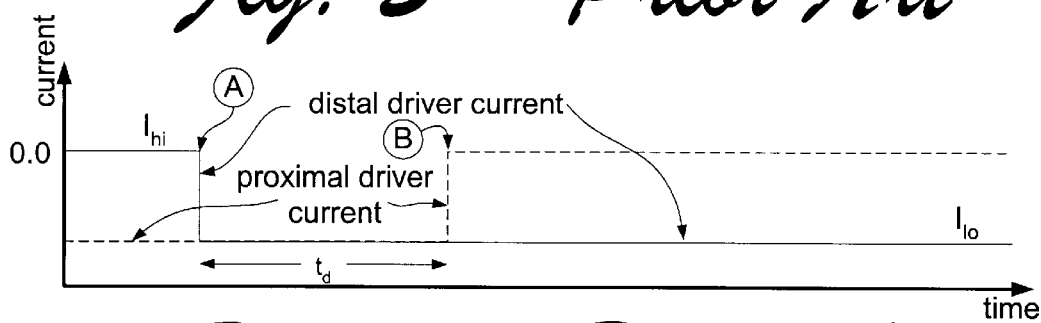
Fig. 6 - Prior Art
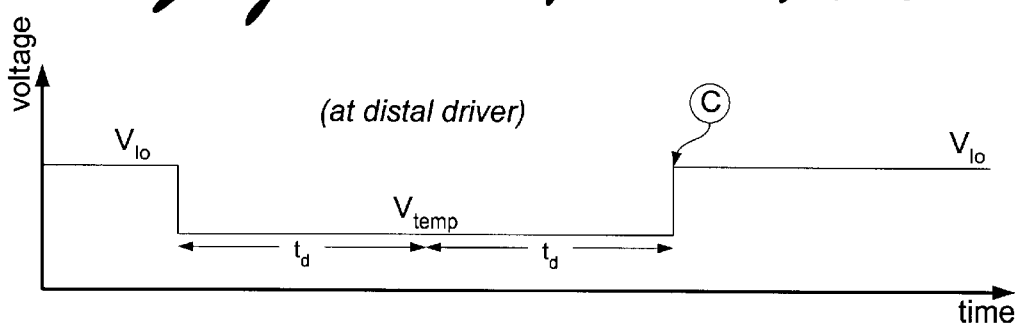
Fig. 7 - Prior Art
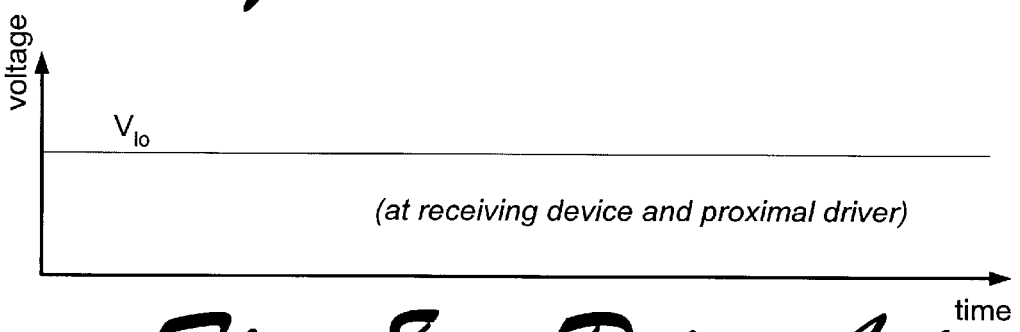
Fig. 8 - Prior Art

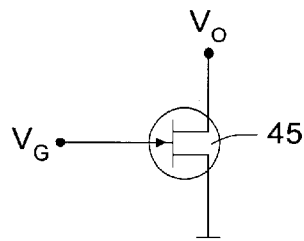
*Fig. 9 - Prior Art*
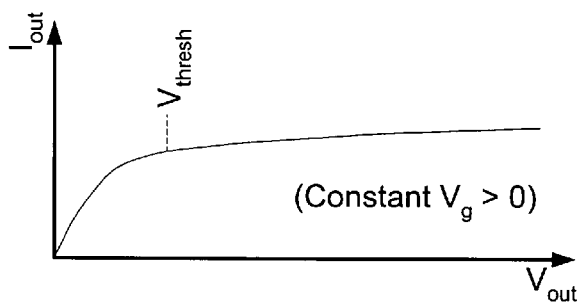
*Fig. 10 - Prior Art*
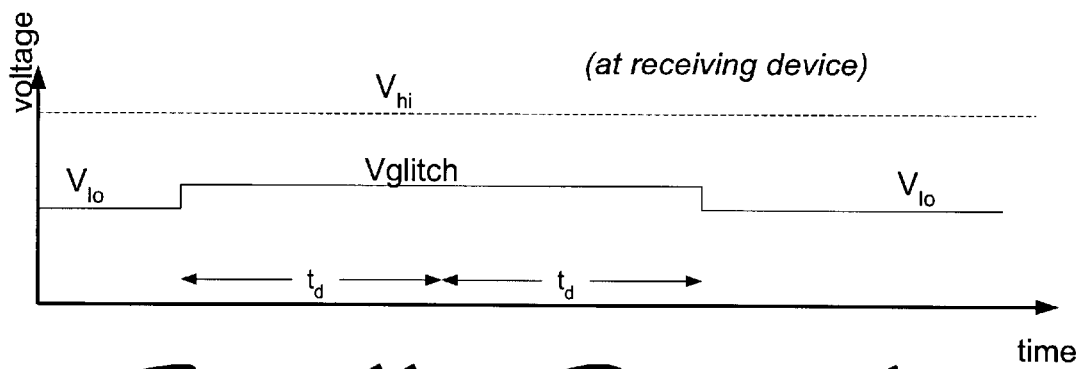
*Fig. 11 - Prior Art*

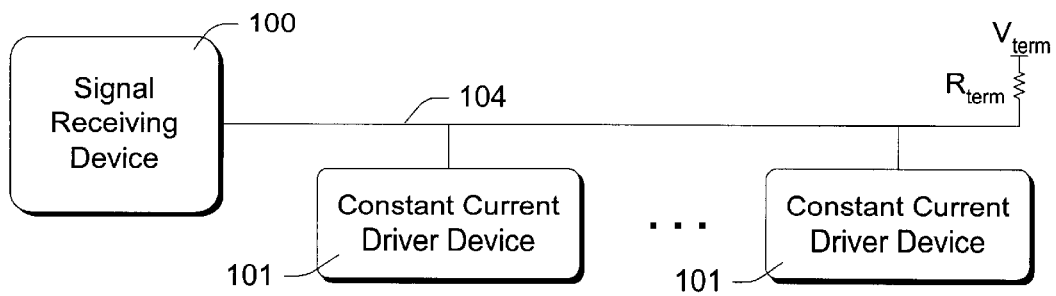
Fig. 12
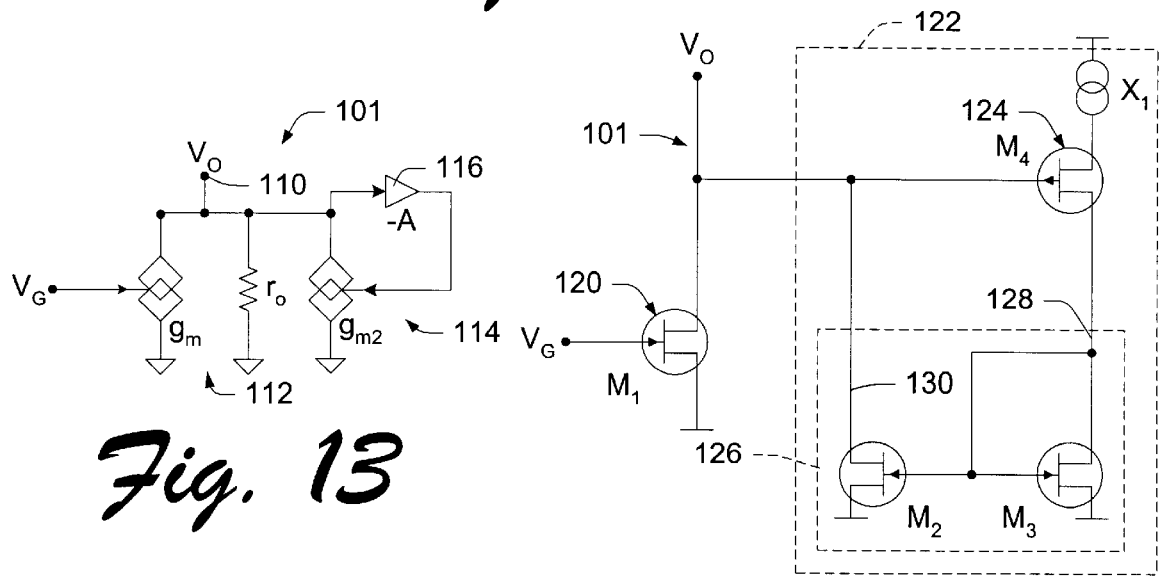
Fig. 13
Fig. 14
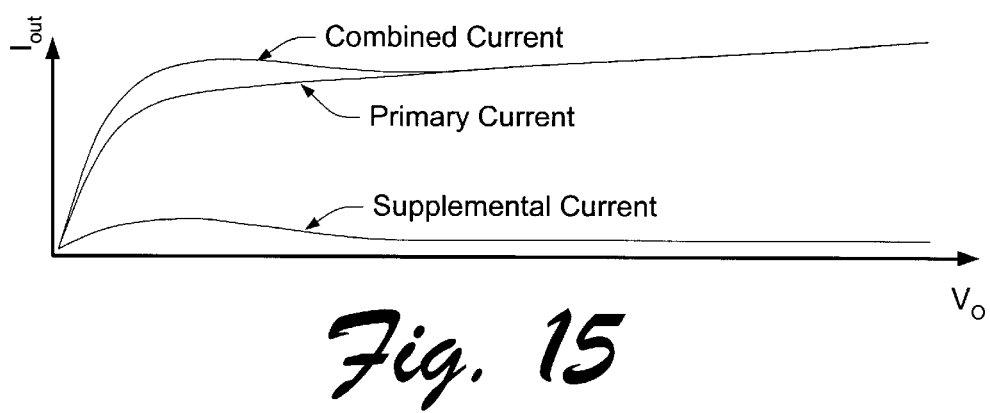
Fig. 15

US 6,618,786 B1

CURRENT-MODE BUS LINE DRIVER HAVING INCREASED OUTPUT IMPEDANCE

TECHNICAL FIELD

The disclosure below relates to current-mode bus line drivers and to methods of achieving relatively constant current output such bus line drivers.

BACKGROUND OF THE INVENTION

Current-mode signaling is ideal for certain situations, such as a bus-based signaling environment. When using current-mode signaling in this environment, an active driver device alternately drives either a high current or a low current on the bus. The current passes through the impedance of the bus line and any termination resistance, thereby producing corresponding voltages on the bus line. Generally, only one driver is active at any given time, and presents a high impedance to the bus when it is not active. However, drivers used in high-speed bus lines are sometime active during overlapping times to enable higher signaling rates.

FIGS. 1–4 illustrate one bus design where two devices might be concurrently active. In this design, there is a single bus line 20 having a fixed impedance. In this example, the bus line impedance is 28 ohms. The bus is terminated at one end with a termination resistance $R_{term}$ which is approximately equal to the bus line impedance of 28 ohms. This end of the bus line is referred to herein as the distal end. The bus is biased by a termination voltage $V_{term}$, which in this example is equal to 1.8 V.

A plurality of driver devices 22–25 are connected to alternately drive bus line 20. In addition, a signal receiving device 26 is connected to receive and interpret bus line signals resulting from the activities of driver devices 22–25. The signal receiving device is located at a first or proximal end of the bus line in this example. The signal receiving device presents a high impedance to the bus line.

FIGS. 2–4 illustrate waveforms that result when driver device 23 transitions from a "high" bus line voltage to a "low" bus line voltage. In this example, the high bus voltage $V_{hi}$ is equal to 1.8 volts, and the low bus voltage $V_{lo}$ is equal to 1.0 volts. To produce $V_{hi}$ on the bus, driver device 23 supplies no current to the bus. To produce $V_{lo}$, driver device 23 sinks 30 mA.

FIG. 2 shows the current waveform at driver device 23 as it transitions from $V_{hi}$ to $V_{lo}$. Initially, the current is zero, resulting in a bus voltage of $V_{hi}$. When driver device 23 switches to produce a "low" bus voltage of $V_{lo}$, the current through the driver device is −30 mA.

FIG. 3 shows the resulting voltage waveform at driver device 23. Initially, at the transition of driver device 23 from 0 to 30 mA, driver device 23 sees an impedance of 28 ohms in each bus line direction. These two impedances are seen in parallel, so the overall impedance is equal to 1/(1/28+1/28) or 14 ohms. The voltage drop across this impedance is equal to impedance multiplied by current, or −30 mA×14 ohms (about −400 mV). The bus line is biased at its distal end by 1.8 V, so the resulting voltage at driver device 23 is 1.8 V−400 mV=1.4 V. This voltage level (1.4 V) is referred to as intermediate voltage $V_{int}$ in FIG. 3. Generally, $V_{int}$ is equal to $(V_{hi}+V_{lo})/2$.

This 400 mV voltage signal propagates in each direction on the bus line, at a finite velocity. When the signal gets to the distal end of the bus line, it encounters the matched impedance of $R_{term}$, and there is no signal reflection. When the signal gets to the proximal end of the bus, however, it encounters the infinite input impedance of signal receiving device 26. This causes a voltage reflection, creating a return voltage wave whose amplitude is equal to the voltage of the original −400 mV signal. This voltage subtracts from the existing bus line voltage of 1.4 V, to result in a bus line voltage of $V_{lo}$, or 1.0 V in the illustrated example. FIG. 4 shows the resulting voltage waveform at signal receiving device 26. The signal receiving device sees a single transition from $V_{hi}$ to $V_{lo}$, delayed in time by the propagation delay from driver device 23 to signal receiving device 26.

This second −400 mV signal propagates all the way back to the distal end of the bus line. When the second reflection reaches driver device 23, the driver device sees the full 800 mV signal. This 800 mV signal continues back towards $R_{term}$, which absorbs the signal and eliminates any further reflections. FIG. 3 shows the arrival of this second signal or wavefront at driver device 23, at which time the voltage becomes equal to $V_{lo}$.

At this point, the circuit has reached a steady state voltage of $V_{lo}$, (1.0 V) and no steady-state current flows through the proximal end of the signal line. As a result, the total bus line impedance seen by driver device 23 is now the impedance of the distal side of the bus line: 28 ohms. This is what produces the steady-state output voltage of 1.0 V: $V_{term}$−30 mA×$R_{bus}$=1.0 V.

When it is desired to operate the bus line at the highest possible speeds, subsequent signal transitions are introduced on the bus line before the signal from the earlier transitions have reached their final, steady state. Although this creates complex waveforms at the driving devices, the signal at the signal receiving device remains relatively simple, so that the signal receiving device can interpret the signal by differentiating only between two signal voltages: $V_{hi}$ and $V_{lo}$.

However, the situation becomes slightly more complicated in the case of so-called "back-to-back" reads from driver devices. A back-to-back read is when a first driver device produces a signal that is immediately followed by a signal from a second driver device. Because of signal propagation delays, this has the potential of creating signal glitches, sometimes referred to as "wired-OR glitches."

Consider the example shown in FIG. 5 where the bus configuration includes a signal receiving device 40, a first and proximal driver device 41, and a second and distal driver device 42. In this example, $t_d$ represents the signal propagation delay between distal driver device 42 and proximal driver device 41. The symbol $t_r$ represents the signal propagation delay between proximal driver device 41 and signal receiving device 40.

Assume that proximal driver device 41 produces a low voltage signal, which is immediately followed by a low voltage signal from device driver 42. One way to accomplish this is to turn off proximal driver device 41 simultaneously with turning on driver device 42. Because of signal propagation delays, however, this would result in a voltage glitch at signal receiving device 40: the terminating signal from device 41 would reach signal receiving device 40 before the new signal from device 42 arrived. In other words, it would appear that the bus was not being driven for some short period of time.

While a glitch such as this could perhaps be accommodated, doing so would not utilize the full bandwidth of the bus line. To utilize the full bandwidth, distal driver device 42 is turned on for some time prior to turning off proximal driver device 41, so that its signal reaches signal receiving device 40 at the same time as the trailing edge of the signal from proximal driver device 41.

FIGS. 6–8 illustrate this sequence. FIG. 6 shows the current waveforms at distal driver device 41 and proximal driver device 42, respectively. At point A, the distal driver device 42 is turned on and begins sinking 30 mA. At a later time B, the proximal driver device 42 is turned off and stops sinking current. The time from A to B is equal to $t_d$.

FIG. 7 shows the resulting voltage at distal driver device 42. At point A, when distal driver device 42 is turned on, the bus is presented with an additional current of 30 mA. Initially, this current sees an effective resistance of 14 ohms. The additional voltage drop caused by this current is equal to the original bus line voltage of 400 mV. The total voltage drop on the bus signal line is the sum of the voltage drop caused by proximal driver device 41 and the voltage drop caused by distal driver device 42: 800 mV+400 mV=1200 mV. Since the bus is terminated at 1.8 volts, the resulting bus line voltage is 1.8 V−1.2 V=600 mV. This bus line voltage is referred to as $V_{temp}$ in FIG. 7.

The $V_{temp}$ signal propagates toward proximal driver device 41 and signal receiving device 40. When it reaches proximal driver device 41 at point A, proximal driver device 41 is turned off. FIG. 8 shows the resulting voltage waveforms at proximal driver device 41 and at receiving device 40. The voltage at these points remains at a constant $V_{lo}$ (1.0 V) at both of these devices, which is the desired result.

This $V_{lo}$ signal reaches distal driver 42 at point C, illustrated in FIG. 7, at which time the voltage at distal driver 42 returns to $V_{lo}$.

The operation illustrated by FIGS. 6–8 assumes that the distal driver device 42 is able to supply a constant current to bus line 45. In many cases, however, this is difficult to accomplish. This is because of the current/voltage characteristics of the MOS current driver transistors used in many circuits of this type.

FIG. 9 shows an open-drain NMOS transistor current source 45 as used in many prior art current-mode drivers. The gate of transistor 45 is connected to a constant voltage $V_G$. The source is tied to a low voltage (usually the chip ground Vss), and the drain is connected to the bus line. Current drawn through the transistor is also drawn through the bus line, which in turn lowers the voltage $V_O$ of the bus line.

FIG. 10 shows the current/voltage characteristics of a MOS transistor at a given gate voltage $V_G$. At drain output voltages $V_O$ that are above a pinch-off or threshold voltage $V_{DSAT}$ (in this example equal to about 1.0 V), the current output Iout is somewhat constant with varying output voltages. Below $V_{DSAT}$, however, the output current falls quickly. At $V_O$=600 mV, $I_{Out}$ falls from the desired 30 mA to as much as 15% below that value.

FIG. 11 shows the result at receiving device 40 of this drop in output current, in the back-to-back read example discussed above with reference to FIGS. 7–9. Assume that distal driver device 42 is able to supply a current of 25 mA at the reduced voltage $V_{temp}$ (shown in FIG. 7). This produces an initial voltage drop of 25 mA×14 ohms: about 350 mV. This drop is in addition to the 400 mV drop already being created by proximal driver device 41. The front of the resultant wave propagates toward controller 40 along with the trailing edge of the signal from proximal driver device 41. When the 350 mV wave reaches controller 40 (after a delay of $t_d+t_r$), a reflection doubles the value of the voltage drop from 350 mV to 700 mV. Thus, the voltage at controller 40 is initially 1.0 V, but then rises to 1.1 volts—a 10% increase over the nominal low input voltage of controller 40, and a 30% increase relative to the nominal high/low input margin of signal receiving device 40. This higher voltage, referred to in FIG. 10 as $V_{glitch}$, persists until the wave propagates back to distal driver device 42, at which time this device sees an increased line impedance of 28 ohms (and a higher corresponding line voltage) and begins to output more current. A second wave is then created and propagated toward controller 40. When this wave reaches controller 40 (after another delay of $t_d+t_r$), the voltage at controller 40 will regain its steady-state voltage of 1.0 V.

Although FIG. 11 illustrates a back-to-back read operation involving two adjacent "lows," other transitions produce analogous results. Also, it should be noted that FIGS. 7 and 11 have been simplified by disregarding the effects of "voltage doubling" at controller 40.

In many designs, this temporary increase in the "low" voltage level prevents signal receiving device 40 from properly interpreting the received signal.

The problem can theoretically be solved in a couple of different ways, each of which has its own disadvantages. One solution is to operate the bus at higher voltages (above $V_{DSAT}$), thereby staying in the constant-current portion of the MOS transistor output. However, the fastest signal receiving devices often require low voltages to achieve their high speeds. Going to higher bus voltages would prevent the use of these relatively fast receiving devices.

Another approach is to lower the gate voltage of the drive transistor, and to use a bigger transistor. A lower gate voltage generally lowers $V_{DSAT}$. However, using a bigger transistor raises the open-drain output capacitance of the driver device by a significant factor. This in turn affects the bus line impedance and the propagation velocity along the bus line. Furthermore, lowering the gate voltage severely increases its sensitivity to on-chip local noise. Dealing with this noise requires increased amounts of local bypassing of the gate voltage, increased power rails and/or additional $V_{ss}$ pins. Thus, this approach is often quite undesirable.

The inventors have found a way to provide nearly constant current from a MOS-based constant-current source, without resorting to either of the undesirable prior art solutions noted above. This allows higher bus speeds without the need to raise bus voltages or to use bigger drive transistors.

SUMMARY

Described below is a current mode driver that provides constant output current at comparatively lower voltages than drivers of the prior art. In addition to a primary open-drain NMOS transistor, the described driver includes a supplemental current source that corrects for decreased output current from the primary transistor at low output voltages.

The supplemental current source comprises a voltage inverter and a current mirror. The voltage inverter produces a correction current that is inversely related to the output voltage of the primary transistor. The current mirror amplifies this current and supplies a supplemental current to the primary current generate by the primary transistor. The current mirror is self-limiting, to limit the supplemental current supplied by the supplemental current source.

BRIEF DESCRIPTION OF THE DRAWINGS

FIG. 1 shows a prior art bus line system.

FIGS. 2–4 show current and voltage waveforms corresponding to a hypothetical situation induced on the system of FIG. 1.

FIG. 5 shows a prior art bus line system similar to that of FIG. 1.

FIGS. 6–8 show current and voltage waveforms corresponding to another hypothetical situation induced on the system of FIG. 5.

FIG. 9 shows a prior art open-drain MOS transistor.

FIG. 10 shows voltage/current characteristics of the transistor shown in FIG. 9.

FIG. 11 illustrates a voltage glitch that can occur in prior art systems when current-mode drivers do not supply constant current at low output voltages.

FIG. 12 shows an exemplary bus line system.

FIG. 13 shows a representation of a constant-current bus line driver.

FIG. 14 shows one implementation of the constant-current bus line driver shown in FIG. 13.

FIG. 15 shows voltage/current characteristics of the bus line driver shown in FIG. 14.

DETAILED DESCRIPTION

Figure 16:
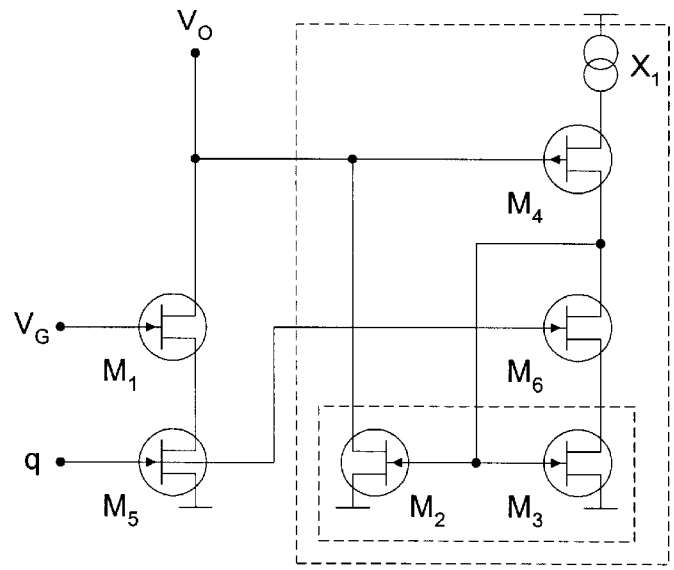
FIGS. 16, 17, and 18 show additional embodiments of a bus line driver, based on the driver circuit shown in FIG. 14.

FIG. 12 shows a bus signaling system comprising a signal receiving device 100 and a plurality of constant-current driver devices 101, connected for digital communications through a bus line 104. The bus line has an impedance of $R_{bus}$, and is terminated at its distal end to a constant termination voltage $V_{term}$ through a resistance $R_{term}$. $R_{term}$ is preferably equal to $R_{bus}$. The signal receiving device is at the proximal end of the bus line.

This system is similar to the one described with reference to FIG. 1, and normally includes a plurality of bus lines that are connected similarly to the single bus line show.

FIG. 13 shows a conceptual representation of a constant-current driver device 101 which is suitable for use with the bus signaling system of FIG. 12 and with other bus signaling systems. Driver device 101 is implemented with MOS or MOSFET technology to supply a constant current at lower bus voltages than the current-mode drivers of the prior art.

Each driver device 101 has an output 110 that is electrically coupled to bus line 104. Output 110 draws current, which in turn reduces the voltage on bus line 104 and thereby enables driver 101 to generate voltage signal on bus line 104. In actual implementation, the driver device includes a switching device connected to alternatively enable and disable the driver device, to create "high" and "low" voltage signals.

Each driver device 101a comprises a primary current source 112 and a supplemental, current feedback circuit or source 114. The primary current source 112 comprises a transconductance $g_m$ in parallel with a resistance $r_O$. This represents the electrical characteristics of an open-drain NMOS transistor having a finite output impedance. The current output of transconductance $g_m$ is controlled by gate source voltage $V_G$, which is kept constant. The output of transconductance $g_m$ forms driver device output 110, and therefore supplies an output current through the bus line. Because of finite resistance $r_o$, primary current source 112 supplies decreased output current at low bus line voltages.

The supplementary current source 114 is responsive to the bus line voltage (equivalent to $V_O$) to supplement the output current of the primary current source 112 at low bus line voltages. Current source 114 comprises a transconductance device $g_{m2}$ and a voltage inverter 116. The voltage inverter has a gain of A. Inverter 116 has an input that is electrically coupled to the output of transconductance $g_m$. Inverter 116 has an output electrically coupled the input of transconductance $g_{m2}$, to control the current output of transconductance $g_{m2}$. The output of transconductance $g_{m2}$ is electrically coupled to the output of transconductance $g_m$. Although transconductance $g_{m2}$ has a finite output impedance, it is ignored for purposes of this example. Alternatively, the output impedance of transconductance $g_{m2}$ can be considered to be part of resistance $r_o$.

Both primary current source 112 and supplemental current source 114 are preferably implemented with NMOS transistors. However, supplemental current source 114 is preferably implemented with a smaller current source transistor (which supplies less current at similar gate voltages) than that of primary current source 112.

Because of inverter 116, supplemental current source 114 produces a supplemental output current that is inversely related to the bus line voltage or $V_O$. That is, transconductance $g_{m2}$ produces higher output current at lower bus line or $V_O$ voltages. The supplemental output current at least partially corrects for the decreased output current of the primary current source at these lower bus line or $V_O$ voltages. This positive feedback is preferably limited with a current limiting device (not shown) to prevent undesirable high currents at very low bus line voltages.

Mathematical analysis of this circuit shows that its effective output impedance consists of the parallel combination of $r_O$ and $-1/A\ g_{m2}$. The negative resistance of the second term increases the overall output resistance of the driver device.

FIG. 14 shows a MOS implementation of driver 101. The driver includes a primary current source 120, which in this implementation comprises an NMOS, open-drain transistor $M_1$. An NMOS transistor such as this has a finite output impedance, which results in lower output currents at decreased output voltages. The gate of primary transistor $M_1$ is connected to a constant voltage $V_G$, and the drain is connected to a bus line to supply a primary output current through the bus line. The primary output current results in a bus line voltage $V_O$.

Driver 101 also includes a secondary or supplemental current source 122. Supplemental current source 122 is configured to supply a supplemental output current, to supplement the primary output current of $M_1$.

Supplemental current source 122 comprises an inverter 124 and a current mirror 126. Inverter 124 comprises a secondary PMOS transistor $M_4$, having a gate electrically coupled to the bus line and the open-drain output of transistor $M_1$. In response to the bus line voltage, secondary transistor $M_4$ generates a correction current through its source. The correction current is inversely related to the bus line voltage. Specifically, $M_4$ produces higher output current in response to lower bus voltage. A current limiting device $X_1$ is connected in series with $M_4$ to limit the correction current, and to therefore limit the amount of positive feedback that is possible from the supplemental current source.

Current mirror 126 is a conventional current mirror designed to produce an output current that is proportional to an input current. More specifically, the current mirror has an input 128 and an output 130. Input 128 is electrically coupled to the current output or source of secondary transistor $M_4$. Output 130 is electrically coupled to the bus line and to the output of transistor $M_1$, to supply a supplemental output current that is proportional to the correction current.

In this example, the current mirror comprises two NMOS transistors $M_2$ and $M_3$, with their gates connected in common and their sources connected in common to a reference voltage (e.g. the on-chip Vss). The gates of both transistors are also connected back to the drain of transistor $M_3$. The drain of $M_3$ forms input 128, and the drain of $M_2$ forms output 130. This circuit produces a current amplification that is determined by the relative sizes of transistors $M_2$ and $M_1$. The drain of transistor $M_2$ forms the supplemental output current that is supplied in conjunction with the primary output current of $M_1$ to correct for the decreased primary output current of $M_1$ at low bus line voltages.

Operation of the supplemental current source is as follows: as the drain voltage of $M_1$ decreases (thus reducing its output current), the supplemental or feedback current from $M_2$ increases, thus increasing the composite output impedance. Note that the small signal impedance can even become negative over a small range if $M_2$ is of sufficient size relative to $M_1$. In order for the circuit to be effective at high speeds, the pole formed at the input of the current mirror should be smaller than the desired bit time (ideally, the frequency should be close to 1 Hz over the desired output rise time).

Note that the positive feedback provided by the current mirror is self-limiting due to the electrical characteristics of $M_2$. Specifically, the current provided through $M_2$ is generally proportional to its drain-to-source voltage $V_{ds}$. $V_{ds}$, in turn, is equal to the output or bus voltage $V_O$. Thus, as $V_O$ approaches zero, the supplemental current provided by transistor $M_2$ also goes to zero. This characteristic reduces or eliminates any undesirable results that might otherwise result from the positive feedback provided by the current mirror.

FIG. 15 shows current waveforms for the primary current source and the supplemental current source as a function of output voltage $V_O$, as well as the combined currents ($I_{Out}$) from the primary current source and the supplemental current source. It is apparent that the primary current source only approximates a constant current source at voltages higher than a known threshold $V_{DSAT}$. However, the supplemental current source supplies additional current at these low voltages. When combined, the threshold at which constant output current occurs is at a relatively lower voltage than it would be without the supplemental output current.

Figure 17:
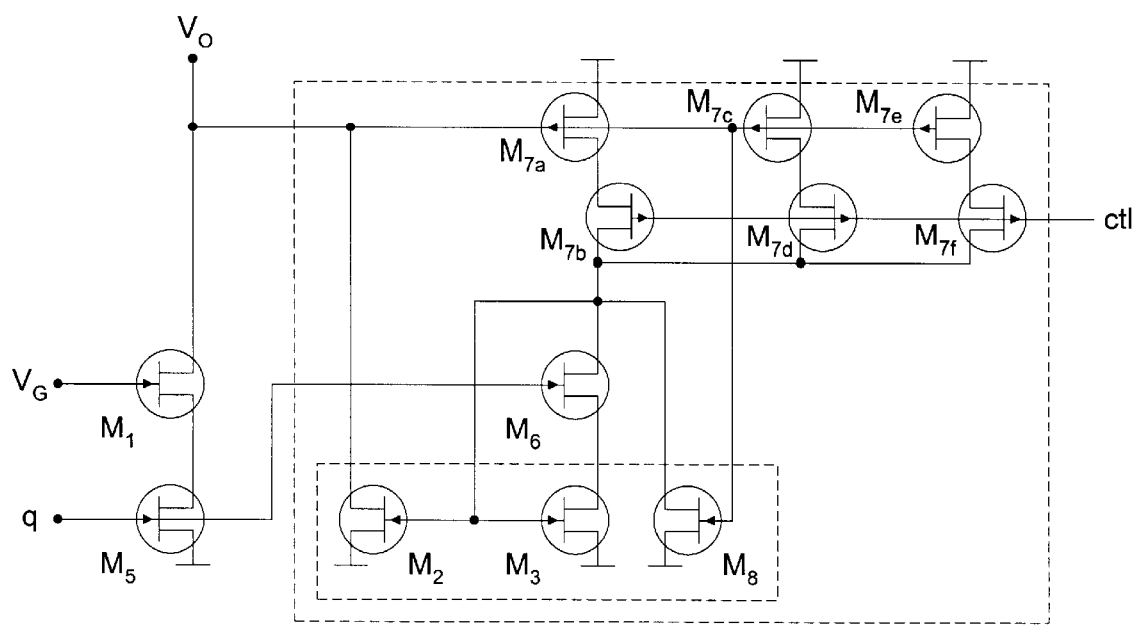
Figure 18:
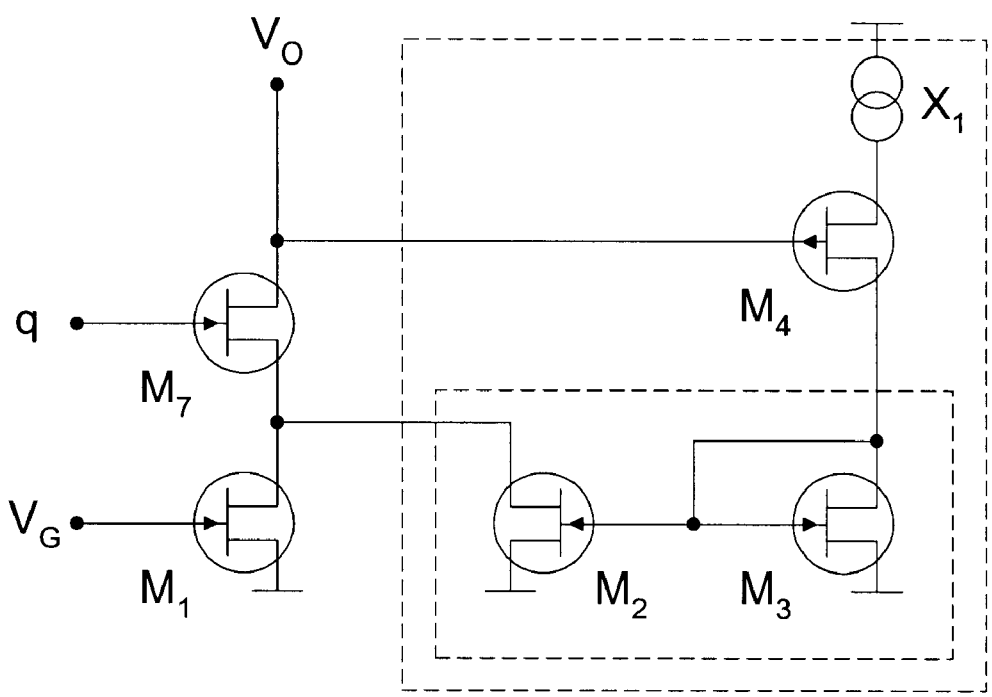

FIGS. 16, 17, and 18 show implementations similar to that shown in FIG. 14, with the addition of switching transistor(s) to enable and disable the driver, and to thereby produce alternatively high and low voltages.

In FIG. 16, two additional NMOS transistors are used for switching purposes: $M_5$ and $M_6$. The gate of transistor $M_5$ is connected to a digital input signal q that indicates whether a high or low output is intended. Transistor $M_5$ is connected in series with transistor $M_1$, and the drain of $M_5$ is connected to the source of $M_1$, $M_6$ is connected between and in series with transistors $M_3$ and $M_4$, with the drain of $M_6$ connected to the source of $M_4$ and the source of $M_6$ connected to the drain of $M_3$. The gate of $M_6$ is connected to digital input signal q. Transistor $M_5$ enables and disables the current flow through $M_1$, while $M_6$ enables and disables current flow through $M_3$.

In FIG. 17, $M_4$, the source of correction current, is replaced by three parallel feedback stacks ($M_{7a}$ and $M_{7b}$, $M_{7c}$ and $M_{7d}$, and $M_{7e}$ and $M_{7f}$) to control the maximum output feedback current across process, voltage, and environmental variations. The bus signal "ctl" controls how many of the parallel stacks are on at any specific time, to increase/decrease the current accordingly.

In addition, a weak transistor $M_8$ has been added to sink a small amount of the current generated by the feedback stacks. As a result of this transistor, when the current from the feedback stack is very small, the supplemental output current is almost zero; when the current from the feedback stack increases, the current through $M_8$ is relaxed and most of the current of the feedback stack is mirrored in the supplemental output current. This ensures that the high frequency response of the current mirror is very similar to the low frequency response.

In FIG. 18, switching is accomplished with a single additional NMOS transistor $M_7$. The gate of transistor $M_7$ is connected to a digital input signal q as described above. The drain and source are connected in series between $M_1$ and the output of the driver device to enable and disable any output current. The gate of $M_4$ is connected to the drain of $M_7$. The output of the current mirror (the drain of $M_2$) is connected between $M_1$ and $M_7$, to the source of $M_7$ and the drain of $M_1$.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A bus signaling system comprising:
   a bus line having an impedance;
   a plurality of current-mode driver devices electrically coupled to generate voltage signals on the bus line;
   each current-mode driver device comprising:
   a primary current source that supplies an output current through the bus line, the output current resulting in a bus line voltage, the primary current source having a finite impedance that results in decreased output current at low bus line voltages; and
   a current feedback circuit responsive to the bus line voltage to supplement the output current of the primary current source at the low bus line voltages.

2. A bus signaling system as recited in claim 1, wherein the current feedback circuit is self-limiting to limit the supplemental output current of the feedback circuit.

3. A bus signaling system as recited in claim 1, wherein the current feedback circuit supplies a supplemental output current, the current feedback device comprising a current-limiting device connected to limit the supplemental output current of the current feedback circuit.

4. A bus signaling system as recited in claim 1, the primary current source comprising a transistor having an input electrically coupled to a constant voltage.

5. A bus signaling system as recited in claim 1, the primary current source comprising a MOS transistor having gate electrically coupled to a constant voltage.

6. A bus signaling system as recited in claim 1, the current feedback circuit comprising a transistor that is responsive to the bus line voltage to generate a correction current at the low bus line voltage.

7. A bus signaling system as recited in claim 1, the current feedback circuit comprising a MOS transistor having a drain connected to a constant voltage and a source that generates a correction current, the correction current being inversely related to the bus line voltage.

8. A bus signaling system as recited in claim 1, each current feedback circuit comprising:
   a transistor that generates a correction current, the correction current being inversely related to the bus line voltage; and a current mirror responsive to the correction current to supply a supplemental output current proportional to the correction current.

9. A bus signaling system as recited in claim 1, the current feedback circuit comprising:
a transistor having an input electrically coupled to the bus line, the transistor having an output, the transistor output generating a correction current that is inversely related to the bus line voltage; and
a current mirror having an input electrically coupled to the transistor output and an output electrically coupled to the bus line, wherein the current mirror supplies a supplemental output current that is proportional to the correction current.

10. A bus signaling system as recited in claim 1, the primary current source being electrically coupled to the bus line through a switching transistor.

11. A bus signaling system as recited in claim 1, the primary current source being enabled and disabled by a switching transistor.

12. A bus signaling system as recited in claim 1, the current feedback circuit being electrically coupled to the bus line through a switching transistor.

13. A bus signaling system as recited in claim 1, the current feedback circuit being enabled and disabled by a switching transistor.

14. A bus signaling system as recited in claim 1, the current feedback circuit being enabled and disabled by a first switching transistor, the primary current source being enabled and disabled by a second switching transistor.

15. A bus signaling system as recited in claim 1, the current feedback circuit being enabled and disabled by a switching transistor, the primary current source being enabled and disabled by the switching transistor.

16. A bus signaling system as recited in claim 9, the current mirror output being electrically coupled to the bus line through a switching transistor.

17. A bus signaling system as recited in claim 9, the current mirror input being electrically coupled to the transistor output through a switching transistor.

18. A current-mode bus driver for generating voltage signals on a bus line having a finite impedance, the current-mode bus driver comprising:
a primary current source that supplies an output current through the bus line, the output current resulting in a bus line voltage, the primary current source having a finite impedance and supplying decreased output current at low bus line voltages; and
a supplemental current source responsive to the bus line voltage to produce a supplemental output current that supplements the output current of the primary current source at low bus line voltages, wherein the supplemental output current at least partially corrects for the decreased output current of the primary current source at the low bus line voltages.

19. A current-mode bus driver as recited in claim 18, wherein the supplemental current source is self-limiting to limit the supplemental output current of the supplemental current source.

20. A current-mode bus driver as recited in claim 18, the primary current source comprising a transistor having an input electrically coupled to a constant voltage.

21. A current-mode bus driver as recited in claim 18, the primary current source comprising a MOS transistor having a gate electrically coupled to a constant voltage.

22. A current-mode bus driver as recited in claim 18, the supplemental current source comprising a transistor that is responsive to the bus line voltage to generate a correction current at the low bus line voltages.

23. A current-mode bus driver as recited in claim 18, the supplemental current source comprising a MOS transistor having a source that generates a correction current, the correction current being inversely related to the bus line voltage.

24. A current-mode bus driver as recited in claim 18, the supplemental current source comprising:
a transistor that generates a correction current, the correction current being inversely related to the bus line voltage; and
a current mirror that is responsive to the correction current to supply the supplemental output current.

25. A current-mode bus driver as recited in claim 18, the primary current source being electrically coupled to the bus line through a switching transistor.

26. A current-mode bus driver as recited in claim 18, the primary current source being enabled and disabled by a switching transistor.

27. A current-mode bus driver as recited in claim 18, the supplemental current source being enabled and disabled by a switching transistor.

28. A current-mode bus driver as recited in claim 18, the supplemental current source being enabled and disabled by a first switching transistor, the primary current source being enabled and disabled by a second switching transistor.

29. A current-mode bus driver as recited in claim 18, the supplemental current source being enabled and disabled by a switching transistor, the primary current source being enabled and disabled by the switching transistor.

30. A current-mode bus driver as recited in claim 18, wherein the supplemental current source produces a supplemental output current, further comprising a current-limiting device connected to limit the supplemental output current supplied by the supplemental current source.

31. A current-mode bus driver for generating voltage signals on a bus line having a finite impedance, the current-mode bus driver comprising:
a primary current source that supplies an output current through the bus line, the output current resulting in a bus line voltage, the primary current source having a finite impedance and supplying decreased output current at low bus line voltages; and
a supplemental current source responsive to the bus line voltage to produce a supplemental output current that supplements the output current of the primary current source at low bus line voltages, wherein the supplemental output current at least partially corrects for the decreased output current of the primary current source at the low bus line voltages;
wherein the supplemental current source comprises:
a transistor having a gate that is electrically coupled to the bus line, the transistor having an output that produces a correction current; and
a current mirror having an input electrically coupled to the transistor output and an output electrically coupled to the bus line, wherein the current mirror supplies the supplemental output current in proportion to the correction current.

32. A current-mode bus driver as recited in claim 31, wherein the current mirror is self-limiting to limit the supplemental output current.

33. A current-mode bus driver as recited in claim 31, the current mirror having an output electrically coupled to the bus line through a switching transistor.

34. A current-mode bus driver as recited in claim 31, the current mirror input being electrically coupled to the transistor output through a switching transistor.

35. A current-mode bus driver for generating voltage signals on a bus line having a finite impedance, the current-mode bus driver comprising:
    a primary NMOS transistor current source having a gate electrically coupled to a gate voltage and a drain electrically coupled to the bus line, the primary NMOS transistor current source supplying a primary output current through the bus line, the primary output current resulting in a bus line voltage, the primary NMOS transistor current source having a finite impedance that results in decreased primary output current at low bus line voltages;
    a secondary PMOS transistor current source having a gate electrically coupled to the bus line, the secondary PMOS transistor current source having a source that generates a correction current; and
    a MOS current mirror having an input electrically coupled to the source of the secondary PMOS transistor current source and an output that supplies a supplemental output current in conjunction with the primary output current to correct for the decreased primary output current of the primary NMOS transistor source at the low bus line voltages.

36. A current-mode bus driver as recited in claim 35, wherein the MOS current mirror is self-limiting to limit the supplemental output current.

37. A current-mode bus driver as recited in claim 35, further comprising a current-limiting device connected to limit the supplemental output current.

38. A current-mode bus driver as recited in claim 35, the correction current being inversely related to the bus line voltage.

39. A current-mode bus driver as recited in claim 35, the MOS current mirror having an output electrically coupled to the bus line through a switching transistor.

40. A current-mode bus driver as recited in claim 35, the input of the current mirror being electrically coupled to the source of the secondary PMOS transistor current source through a switching transistor.

41. A current-mode bus driver as recited in claim 35, the primary NMOS transistor current source being electrically coupled to the bus line through a switching transistor.

42. A current-mode bus driver as recited in claim 35, the primary NMOS transistor current source being enabled and disabled by a switching transistor.

43. A current-mode bus driver as recited in claim 35, the MOS current mirror being enabled and disabled by a switching transistor.

44. A current-mode bus driver as recited in claim 35, the MOS current mirror being enabled and disabled by a first switching transistor, the primary NMOS transistor current source being enabled and disabled by a second switching transistor.

45. A current-mode bus driver as recited in claim 35, the MOS current mirror being enabled and disabled by a switching transistor, the primary NMOS transistor current source being enabled and disabled by the switching transistor.

46. A method of generating voltage signals on a bus line having a finite impedance, the method comprising:
    supplying a primary output current through the bus line with a primary current source having a finite impedance, wherein the primary current source supplies decreased output current at a low bus line voltage; and
    correcting the decreased output current by supplying a supplemental output current through the bus line, wherein the supplemental output current is inversely related to the bus line voltage.

47. A method as recited in claim 46, the primary current source comprising a transistor having an input electrically coupled to a constant voltage.

48. A method as recited in claim 46, wherein the supplemental output current is supplied by a supplemental output current source comprising:
    a transistor that generates a correction current; and
    a current mirror that is responsive to the correction current to supply the supplemental output current.

49. A method as recited in claim 46, further comprising enabling and disabling the primary output current with a switching transistor.

50. A method as recited in claim 46, further comprising enabling and disabling the supplemental output current with a switching transistor.

51. A method as recited in claim 46, further comprising:
    enabling and disabling the supplemental output current with a first switching transistor; and
    enabling and disabling the primary output current with a second switching transistor.

52. A method as recited in claim 46, further comprising:
    enabling and disabling the supplemental output current with a switching transistor; and
    enabling and disabling the primary output current with the switching transistor.

53. A method as recited in claim 46, further comprising limiting the supplemental output current.

54. A bus signaling system comprising:
    bus means for propagating voltage signals, the bus means having an impedance;
    driving means for driving the voltage signals on the bus means, the driving means including a plurality of current-mode driving means for generating the voltage signals on the bus means by outputting current;
    each current-mode driving means comprising:
        first means for sourcing current that supplies at least one output current through the bus means, the at least one output current resulting in a bus voltage on the bus means, the first means for sourcing current having a finite impedance that results in decreases to the at least one output current when the bus voltage drops; and
        second means for sourcing current responsive to the bus voltage to augment the at least one output current of the first means for sourcing current as the bus voltage drops.

55. A system for generating voltage signals on a bus line, the system comprising:
    primary means for sourcing current that supplies an output current through the bus line, the output current resulting in a bus line voltage, the primary means for sourcing current having a finite impedance and supplying decreased output current at low bus line voltages; and
    supplemental means for sourcing current responsive to the bus line voltage to produce a supplemental output current that supplements the output current of the primary means for sourcing current at the low bus line voltages, wherein the supplemental output current at least partially corrects for the decreased output current of the primary means for sourcing current at the low bus line voltages.

* * * * *